United States Patent
Sakaguchi et al.

(10) Patent No.: US 8,768,043 B2
(45) Date of Patent: Jul. 1, 2014

(54) IMAGE DISPLAY APPARATUS, IMAGE DISPLAY METHOD, AND PROGRAM

(75) Inventors: Tatsumi Sakaguchi, Kanagawa (JP); Hiroshi Kajihata, Tokyo (JP); Hiroshi Oryoji, Kanagawa (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 13/139,497

(22) PCT Filed: Oct. 12, 2010

(86) PCT No.: PCT/JP2010/006060
§ 371 (c)(1),
(2), (4) Date: Jun. 13, 2011

(87) PCT Pub. No.: WO2011/048773
PCT Pub. Date: Apr. 28, 2011

(65) Prior Publication Data
US 2011/0243388 A1    Oct. 6, 2011

(30) Foreign Application Priority Data
Oct. 20, 2009 (JP) ............................... P2009-241700

(51) Int. Cl.
*G06K 9/00* (2006.01)

(52) U.S. Cl.
USPC ........................... 382/154; 345/419; 382/103

(58) Field of Classification Search
USPC ................... 345/419, 581; 382/103, 106, 154
See application file for complete search history.

(56) References Cited

U.S. PATENT DOCUMENTS

| 6,760,021 | B1 * | 7/2004 | Karszes et al. ................ 345/419 |
| 8,246,170 | B2 * | 8/2012 | Yamamoto et al. ............. 353/28 |
| 8,295,643 | B2 * | 10/2012 | Yamaguchi et al. .......... 382/291 |
| 8,369,607 | B2 * | 2/2013 | Mashitani et al. ............ 382/154 |
| 8,398,242 | B2 * | 3/2013 | Yamamoto et al. ............. 353/28 |
| 8,496,575 | B2 * | 7/2013 | Doi ............................... 600/117 |
| 2006/0238502 | A1 | 10/2006 | Kanamori et al. |

(Continued)

FOREIGN PATENT DOCUMENTS

| JP | 3791848 | 4/2006 |
| JP | 2007-047294 | 2/2007 |

OTHER PUBLICATIONS

Takahiro et al., "Method and Device for Image Processing," Patent Abstracts of Japan, JP-07-296194, filed Nov. 11, 1995.

(Continued)

*Primary Examiner* — Gregory M Desire
(74) *Attorney, Agent, or Firm* — Finnegan, Henderson, Farabow, Garrett & Dunner, L.L.P.

(57) ABSTRACT

An image display apparatus may include a display section for presenting an image. The apparatus may also include a viewing angle calculation section for determining a viewing angle of a user relative to the display section. Additionally, the apparatus may include an image generation section for generating first image data representing a first image, and for supplying the first image data to the display section for presentation of the first image. The image generation section may generate the first image data based on the user's viewing angle, second image data representing a second image, and third image data representing a third image. The second image may include an object viewed from a first viewing angle and the third image may include the object viewed from a second viewing angle, the first viewing angle and the second viewing angle being different from each other and from the user's viewing angle.

14 Claims, 10 Drawing Sheets

(56) References Cited

U.S. PATENT DOCUMENTS

| | | | |
|---|---|---|---|
| 2007/0035628 A1* | 2/2007 | Kanai | 348/159 |
| 2009/0184981 A1* | 7/2009 | de Matos | 345/676 |
| 2009/0303313 A1* | 12/2009 | Yukich | 348/48 |
| 2010/0002006 A1* | 1/2010 | Mauchly et al. | 345/581 |
| 2011/0243388 A1* | 10/2011 | Sakaguchi et al. | 382/103 |

OTHER PUBLICATIONS

International Search Report from the Japanese Patent Office for International Application No. PCT/JP2010/006060 (Mail date Nov. 30, 2010).

* cited by examiner

FIG.10

IMAGE DISPLAY APPARATUS, IMAGE DISPLAY METHOD, AND PROGRAM

TECHNICAL FIELD

The present invention relates to an image display apparatus, an image display method, and a program, and more particularly, to an image display apparatus, an image display method, and a program that are capable of displaying a three-dimensional image in a pseudo manner.

BACKGROUND ART

Television receivers that display three-dimensional images are being widely used. The television receivers that display three-dimensional images display parallax images as three-dimensional images by causing right and left eyes of humans to view the parallax images.

To three-dimensionally display the parallax images, a dedicated display apparatus (in addition thereto, auxiliary instrument such as polarized glasses) is needed. Therefore, it has been difficult to enjoy three-dimensional images only with a known display apparatus for two-dimensional images.

Further, for example, in a case where content constituted of three-dimensional images is recorded on a Blu-Ray Disc (registered trademark), the three-dimensional images can be reproduced if a display apparatus that supports content constituted of three-dimensional images is used. However, since a known display apparatus (without ability to display three-dimensional images) cannot display images as three-dimensional images, content has been created such that only left-eye images can be displayed when the content is displayed.

Furthermore, in the past, there has been an attempt to cause a user to perceive a subject as if the subject had a pseudo three-dimensional structure by using a portable terminal typified by a cellular phone as a view port.

For example, there is proposed a technique using a CG (Computer Graphics) model with a three-dimensional structure or selecting and displaying videos of a three-dimensional object that are captured from many different viewpoints in accordance with a movement of a terminal (see Patent Document 1).

Further, there is proposed a technique in which CG data with a three-dimensional structure is prepared, and is subjected to rendering and displayed while viewpoints are changed in accordance with a movement of a terminal, thus displaying a pseudo three-dimensional image (see Patent Document 2).

CITATION LIST

Patent Literature

PTL 1: Japanese Patent No. 3791848
PTL 2: Japanese Patent Application Laid-open No. 2007-047294

SUMMARY OF INVENTION

However, in the technique disclosed in Patent Document 1 described above, the three-dimensional structure has been known or it has been necessary to prepare image groups capable of judging the three-dimensional structure in advance.

Further, in the technique disclosed in Patent Document 2 described above, a similar technique of displaying a three-dimensional image based on multi-perspective live-action images that are not CG data is also mentioned but a step of restoring a three-dimensional structure is required. Therefore, it is anticipated that the technique is difficult to be applied to actual time or a moving image.

Accordingly, there is disclosed an image display apparatus. The image display apparatus may include a display section for presenting an image. The image display apparatus may also include a viewing angle calculation section for determining a viewing angle of a user relative to the display section. Additionally, the image display apparatus may include an image generation section for generating first image data representing a first image, and for supplying the first image data to the display section for presentation of the first image. The image generation section may generate the first image data based on the user's viewing angle, second image data representing a second image, and third image data representing a third image. The second image may include an object viewed from a first viewing angle and the third image may include the object viewed from a second viewing angle, the first viewing angle and the second viewing angle being different from each other and from the user's viewing angle.

Additionally, there is disclosed a method of presenting an image on a display section of a display apparatus. A processor may execute a program to cause the display apparatus to perform the method. The program may be stored on a computer-readable storage medium. The method may include determining a viewing angle of a user relative to the display section. The method may also include generating first image data representing a first image based on the user's viewing angle, second image data representing a second image, and third image data representing a third image. The second image may include an object viewed from a first viewing angle and the third image may include the object viewed from a second viewing angle, the first viewing angle and the second viewing angle being different from each other and from the user's viewing angle. Additionally, the method may include presenting the first image on the display section.

DESCRIPTION OF EMBODIMENTS

Hereinafter, best modes for performing the present invention (hereinafter, referred to as embodiments) will be described. It should be noted that descriptions will be given in the following order.

1. First embodiment (example of calculating viewing angle based on image captured by camera)
2. Second embodiment (example of calculating viewing angle based on roll and pitch of main body)

First Embodiment (Structural Example of Outer Appearance of Pseudo Three-Dimensional Image Display Apparatus)

Figure 1:
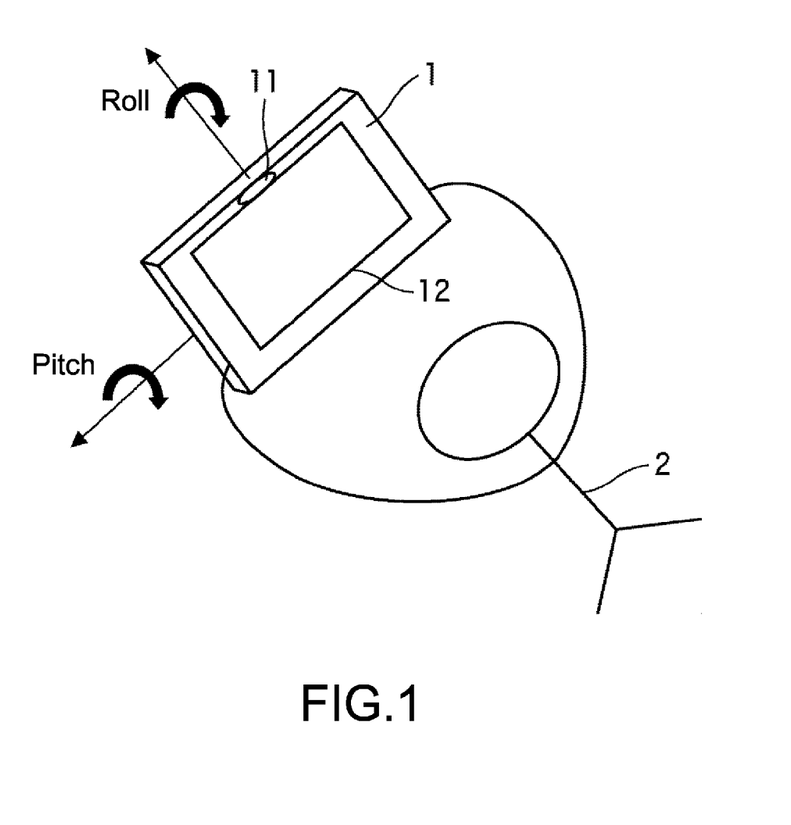
FIG. 1 is a diagram showing an outer appearance of a pseudo three-dimensional image display apparatus to which the present invention is applied.

FIG. 1 is an outer appearance of a pseudo three-dimensional image display apparatus 1 that displays a three-dimensional image in a pseudo manner as a structural example of an embodiment to which the present invention is applied.

The pseudo three-dimensional image display apparatus 1 is a display apparatus that is portable by a user 2 and includes an imaging section 11 and a display section 12. The pseudo three-dimensional image display apparatus 1 generates an image corresponding to a viewing angle of the user 2 by using images stored in an image storage section 32 (FIG. 2) and displays the image on the display section 12.

Specifically, as shown in FIG. 1, when the user 2 changes a roll or a pitch of a main body of the pseudo three-dimensional image display apparatus 1, the pseudo three-dimensional image display apparatus 1 recognizes a viewing angle of the user 2 based on positions of his/her eyes or the like in a face image of the user 2 within an image captured by the imaging section 11. Then, the pseudo three-dimensional image display apparatus 1 uses images stored in the image storage section 32 (FIG. 2) to generate an image corresponding to the viewing angle such that a parallax similar to that obtained when the user 2 views a three-dimensional object while moving is caused, and displays the image on the display section 12. It should be noted that a parallax image realized by the pseudo three-dimensional image display apparatus 1 is not a normal parallax image in which right and left eyes are set as viewpoints, but an image that is caused by a motion parallax, i.e., an image that causes the user to feel as if the user were viewing a three-dimensional object by viewing images of temporally-different viewpoints in accordance with movements of the head and the eyes. Accordingly, an image displayed on the display section 12 of the pseudo three-dimensional image display apparatus 1 is a two-dimensional image, and images to be viewed by the right and left eyes of the user 2 are the same.

Therefore, when the user 2 views the display section 12 while changing the roll or the pitch of the main body of the pseudo three-dimensional image display apparatus 1, an image is displayed such that a parallax is caused in accordance with a change of the viewing angle of the user 2 (angle formed by line-of-sight direction of user 2 and normal direction of display surface of display section 12). As a result, the user 2 suffers a sensory illusion as if the user 2 were viewing an image having a parallax in accordance with the movement of the pseudo three-dimensional image display apparatus 1 even when actually viewing a two-dimensional image displayed on the display section 12 with both eyes. Accordingly, the user 2 feels as if the user 2 were viewing a three-dimensional image in a pseudo manner.

(Structural Example of One Embodiment of Function that is Realized by Pseudo Three-Dimensional Image Display Apparatus)

Next, a structural example of an embodiment of a function realized by the pseudo three-dimensional image display apparatus 1 of FIG. 1 will be described with reference to FIG. 2.

The pseudo three-dimensional image display apparatus 1 includes the imaging section 11, the display section 12, a controller 31, and the image storage section 32.

The imaging section 11 is constituted of an image pickup device such as a CCD (Charge Coupled Device) and a CMOS (Complementary Metal Oxide Semiconductor). As shown in FIG. 1, the imaging section 11 is provided on substantially the same plane as the display section 12 and captures an image of the user 2 holding the pseudo three-dimensional image display apparatus 1. The imaging section 11 supplies a captured image to the controller 31.

The display section 12 is constituted of an LCD (Liquid Crystal Display), an organic EL (Electro Luminescence) display, or the like. As shown in FIG. 1, by causing the user 2 holding the main body of the pseudo three-dimensional image display apparatus 1 to display an image that is supplied from the controller 31 and corresponds to a viewing direction, the display section 12 displays the image as a three-dimensional image in a pseudo manner.

It should be noted that the image captured by the imaging section 11 is an image for specifying a viewing angle of the user 2 with respect to a display surface of the display section 12 to be described later. Therefore, an image captured by the imaging section 11 is an image that corresponds to the display section 12. For example, when an image captured by the imaging section 11 is displayed on the display section 12, the image displayed on the display section 12 becomes a mirror surface image. Accordingly, the imaging section 11 may be provided at any other position as long as the imaging section 11 can capture an image having such a relationship (i.e., a relationship in which the imaging section 11 views the user 2 along a line perpendicular to the display section 12).

The controller 31 controls the entire operation of the pseudo three-dimensional image display apparatus 1, and calculates a viewing angle of the user 2 with respect to the display surface of the display section 12 based on an image supplied from the imaging section 11. Further, the controller 31 reads out parallax images (i.e., image data representing parallax images) stored in the image storage section 32, interpolates and generates a display image (i.e., image data representing the display image) corresponding to the calculated viewing angle, and outputs the display image to the display section 12 for display. It should be noted that the parallax images stored in the image storage section 32 are stereo images of still images, i.e., a pair of images constituted of a right-eye image and a left-eye image.

The controller 31 includes a distance calculation section 41, a viewing angle calculation section 42, and an image generation section (i.e., an image interpolation/generation section 43). The distance calculation section 41 calculates a distance from the display surface of the display section 12 to the user 2 based on the image captured by the imaging section 11. More specifically, the distance calculation section 41 extracts a face image from the image of the user 2 that is captured by the imaging section 11. Then, the distance calculation section 41 roughly calculates the distance based on a size of the face image. It should be noted that the distance from the display surface of the display section 12 to the user 2, which is calculated by the distance calculation section 41, may be measured by an object detection sensor such as an infrared sensor or obtained by other different methods, for example, as long as the distance can be calculated.

The viewing angle calculation section 42 calculates a viewing angle of the user 2 with respect to the display surface of the display section 12 based on the image captured by the imaging section 11. More specifically, the viewing angle calculation section 42 extracts a face image of the user 2 from the captured image. Then, the viewing angle calculation section 42 specifies positions of both eyes in the extracted face image and then specifies the center position therebetween, that is, a position substantially between eyebrows in the image. Further, the viewing angle calculation section 42 calculates a viewing angle of the user 2 based on information of the position between the eyebrows of the user 2 in the image captured by the imaging section 11 and the distance to the user 2 that is calculated by the distance calculation section 41.

The image storage section 32 is constituted of, for example, an HDD (Hard Disc Drive) or a semiconductor memory, and stores a plurality of images. The plurality of images stored in the image storage section 32 is a plurality of pairs of parallax images obtained by capturing the same subject or landscape while changing a viewpoint (line of sight), an imaging direction, an imaging distance, and the like.

Figure 2:
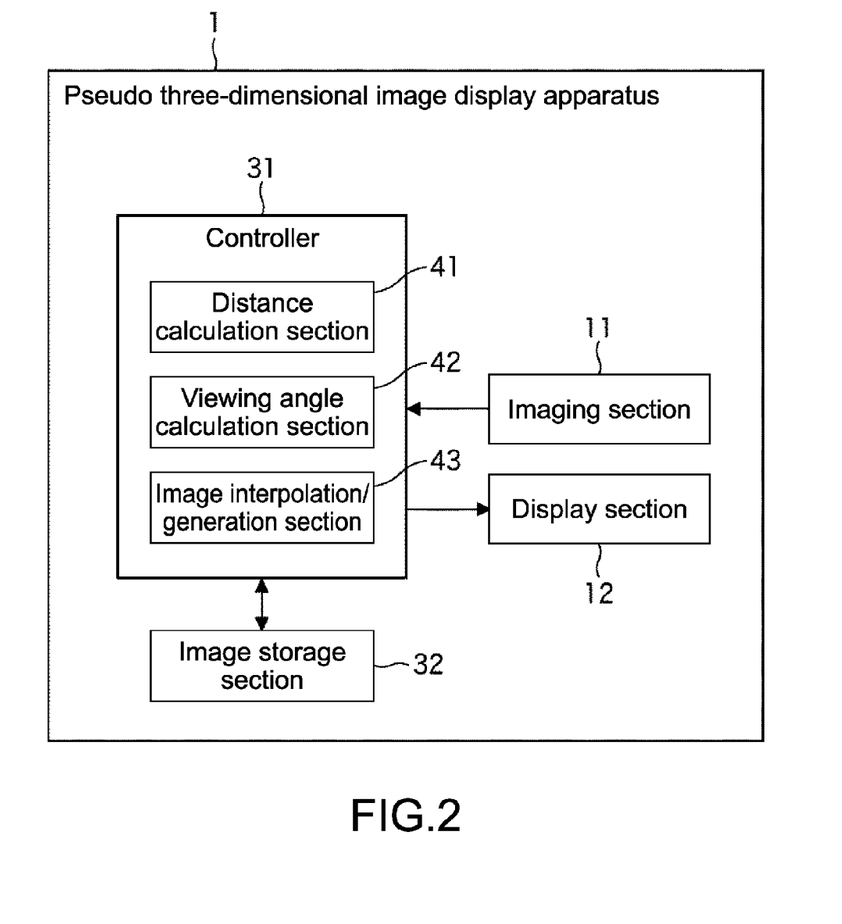
FIG. 2 is a diagram showing a structural example of a function that is realized by the pseudo three-dimensional image display apparatus of FIG. 1.

(Pseudo Three-Dimensional Image Display Processing by Pseudo Three-Dimensional Image Display Apparatus 1 of FIG. 2)

Next, pseudo three-dimensional image display processing by the pseudo three-dimensional image display apparatus 1 of FIG. 2 will be described with reference to a flowchart of FIG. 3.

In Step S1, the imaging section 11 captures an image and supplies the captured image to the controller 31. Specifically, as shown in FIG. 1, since the pseudo three-dimensional image display apparatus 1 is held by the user 2 so that the user 2 views an image displayed on the display section 12, an image of the vicinity of the face of the user 2, the face being opposed to the imaging section 11, is captured and supplied to the controller 31.

In Step S2, the controller 31 controls the distance calculation section 41 to calculate a distance from the display section 12 to the user 2. More specifically, the distance calculation section 41 extracts a face image from the captured image and also calculates a distance based on a size of the extracted face image. In other words, the distance calculation section 41 stores a relational expression indicating a size relationship between face images of a standard-size face that are captured in advance in association with a distance, and calculates a distance by substituting the size of the extracted face image into the relational expression.

In Step S3, the controller 31 controls the viewing angle calculation section 42 to execute viewing angle calculation processing and calculate a viewing angle of the user 2 with respect to the display surface of the display section 12.

(Viewing Angle Calculation Processing by Pseudo Three-Dimensional Image Display Apparatus 1 of FIG. 2)

Figure 4:
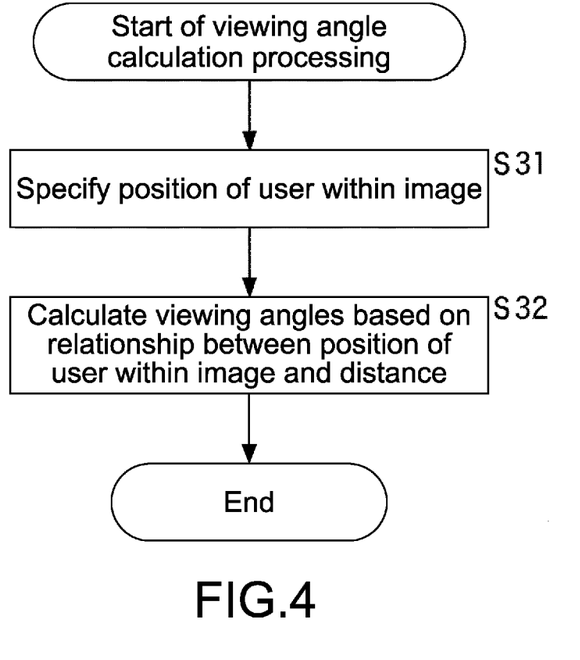
FIG. 4 is a flowchart for explaining viewing angle calculation processing by the pseudo three-dimensional image display apparatus of FIG. 2.

Here, the viewing angle calculation processing will be described with reference to a flowchart of FIG. 4.

In Step S31, the viewing angle calculation section 42 extracts a face image from an image captured by the imaging section 11 and also specifies positions of right and left eyes from the extracted face image. Then, the viewing angle calculation section 42 specifies where the center position between the right and left eyes (for example, position substantially between eyebrows) is in the image captured by the imaging section 11. In other words, the viewing angle calculation section 42 detects displacements of the viewing direction in horizontal and vertical directions from the center position of the display surface of the display section 12.

In Step S32, the viewing angle calculation section 42 calculates viewing angles (theta, phi) in the horizontal direction and the vertical direction, respectively, based on the position between the eyebrows in the image and the distance from the display surface of the display section 12 to the user 2 that is calculated using the image captured by the imaging section 11.

The viewing angle herein is an angle of the line-of-sight direction of the user 2 with respect to the display surface of the display section 12 at a time when the user 2 observes the display section 12. In other words, the viewing angle is a parameter necessary for converting an image as a display target in accordance with an angle for viewing. However, the viewing angle in a real space changes in accordance with a movement distance of the line-of-sight direction in the horizontal direction or vertical direction and a distance from an object to be a subject in the image. Accordingly, the viewing angle changes based on whether the position of a subject existing in the image (for example, object in image) is far from an imaging position or close thereto.

Figure 5:
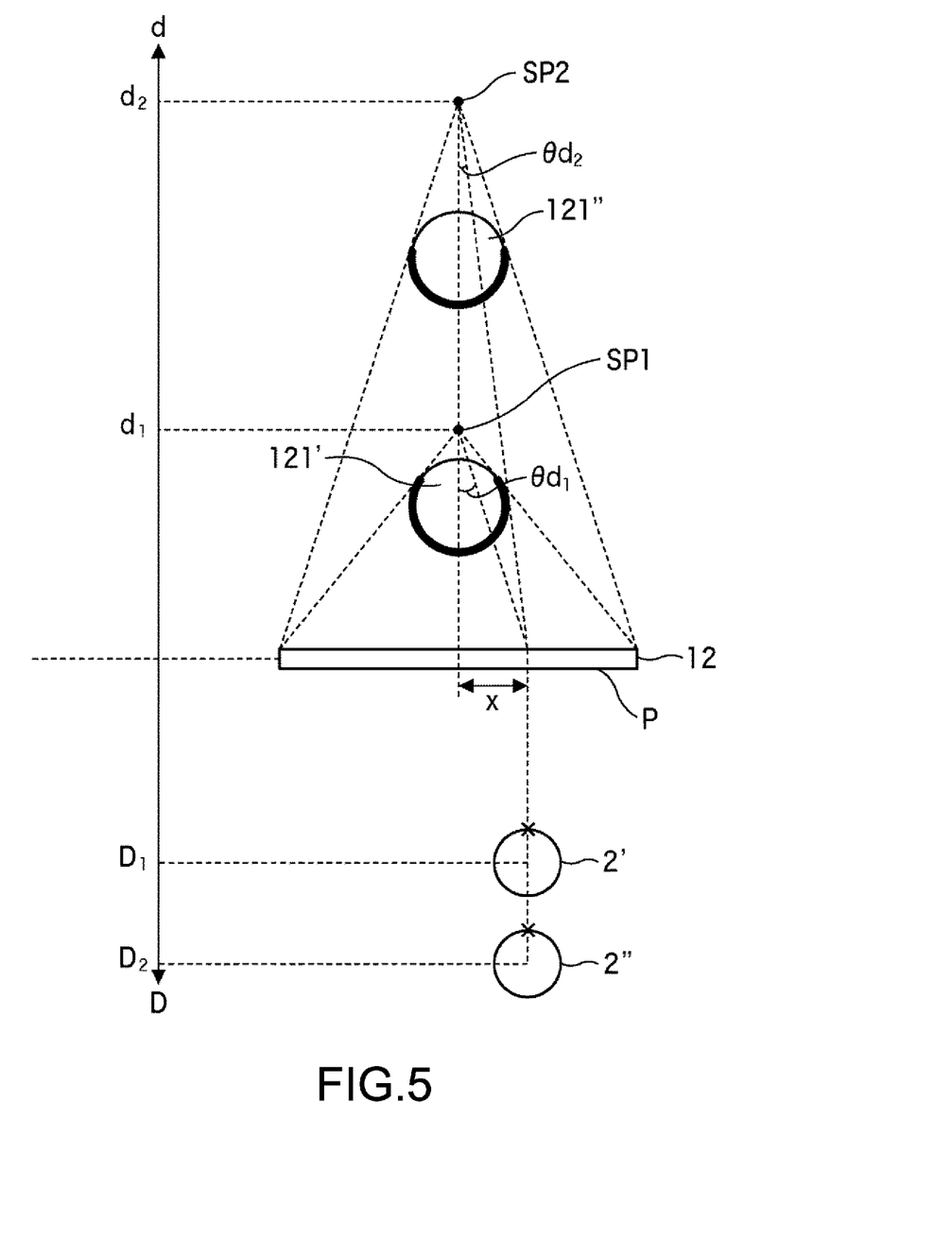
FIG. 5 is a diagram for explaining a viewing angle calculation method.

In other words, in a case of the viewing angle in the horizontal direction, assuming that an image P captured by the imaging section 11 is viewed vertically from above as shown in an upper portion of FIG. 5, a thick line portion of a subject 121' at a distance d1 at which the image P is captured is displayed as an image P that should be displayed on the display section 12 to be an imaging position. On the other hand, in a subject 121" at a distance d2 that is farther than the distance d1 from the imaging device, a range that is indicated by a thick line and is to be displayed on the display section 12 is smaller than that of the subject 121'. Specifically, as the subject is positioned closer, a wider range thereof is displayed on the display section 12. As a result, in a case where the viewing direction is deviated by a distance x in the horizontal direction, the viewing angle is changed by an angle theta d1 with a vanishing point SP1 of the subject 121' as a reference. On the other hand, regarding the subject 121", the viewing angle is an angle theta d2 that is smaller than the angle theta d1 with a vanishing point SP2 of the subject 121" as a reference. In other words, in an image to be viewed, the change in viewing angle is greater as the subject is closer to the imaging position at a time of imaging, whereas the change in viewing angle is smaller as the subject is farther from the imaging position at the time of imaging.

However, the distance to each subject within the image at the time of imaging is difficult to be calculated. In this regard, the viewing angle calculation section 42 virtually sets a distance to the subject in accordance with a distance between the display surface of the display section 12 and the user 2, and calculates the viewing angle in accordance with the virtually-set distance.

Specifically, the viewing angle calculation section 42 virtually sets a distance d to a subject in the image in accordance with a distance D from the display surface of the display section 12 to the user 2, the distance D being calculated by the distance calculation section 41 by the processing of Step S2. More specifically, the viewing angle calculation section 42 carries out an operation using the following expression (1) to calculate a distance d.

$$d = k?D + C \tag{1}$$

Here, d represents a distance to the subject in the image, the distance being virtually set, D represents a distance from the display surface of the display section 12 to the user 2, k represents a predetermined coefficient, and C represents a predetermined constant. By the calculation, as shown in FIG. 5, for example, in a case where a distance from the display surface of the display section 12 to a user 2' is represented as D1 and a distance to a user 2" is represented as D2 that is farther than the distance D1, distances d1 and d2 to the subjects 121' and 121" that are virtually set, respectively, are obtained. In other words, the distance to the subject in the image is set in accordance with the distance between the user and the display surface of the display section 12. It should be noted that in FIG. 5, X marks of the users 2' and 2" each represent the center position between right and left eyes of each user (position between eyebrows).

Then, the viewing angle calculation section 42 obtains a viewing angle theta in accordance with the set distance d as in the following expression (2).

$$\text{theta} = \arctan(x/d) \quad (2)$$

Here, theta represents a viewing angle, d represents a distance to the subject that is virtually set, and x represents a displacement of the position between eyebrows that is obtained by the processing of Step S31, from the center position of the image in the horizontal direction.

Specifically, based on the expression (2), when the distance d is d1 as shown in FIG. 5, the viewing angle theta is an angle of theta d1 and when the distance d is d2, the viewing angle theta is an angle of theta d2. Therefore, when the user 2 views the display section 12 while bringing the face close to and looking into the display section 12, the viewing angle theta is changed largely with respect to the displacement x from the center of the display section 12. In contrast to this, when the user 2 views the display section 12 while keeping the face away from the display section 12, the change of the viewing angle becomes smaller with respect to the displacement x. As a result, it is possible to obtain a viewing angle corresponding to an operation made by the user 2, such as an operation of moving the main body of the pseudo three-dimensional image display apparatus 1 about the pitch or roll, or bringing the main body close to or away from the right and left eyes. It should be noted that a viewing angle phi in the vertical direction can be obtained as in the case of the viewing angle theta in the horizontal direction, and accordingly descriptions thereof are omitted.

Further, each of the viewing angles (theta, phi) in FIG. 5 should be an angle of the normal direction of the display section 12 with respect to a straight line connecting the user 2' and the subject 121' or connecting the user 2" and the subject 121". For that reason, the viewing angles (theta, phi) in FIG. 5 are not in an appropriate relationship in a strict sense. In this case, however, a relative relationship between a direction viewed by the right and left eyes of the user 2 and the normal direction of the display surface of the display section 12 only needs to be obtained. In addition, a change of the direction viewed by the right and left eyes of the user 2 at a time when the user 2 moves the main body of the pseudo three-dimensional image display apparatus 1 about the pitch or roll and a change of the normal direction of the display surface of the display section 12 only need to be relatively associated with each other and obtained. Therefore, matters other than the viewing angle described above may be defined as viewing angles.

Figure 3:
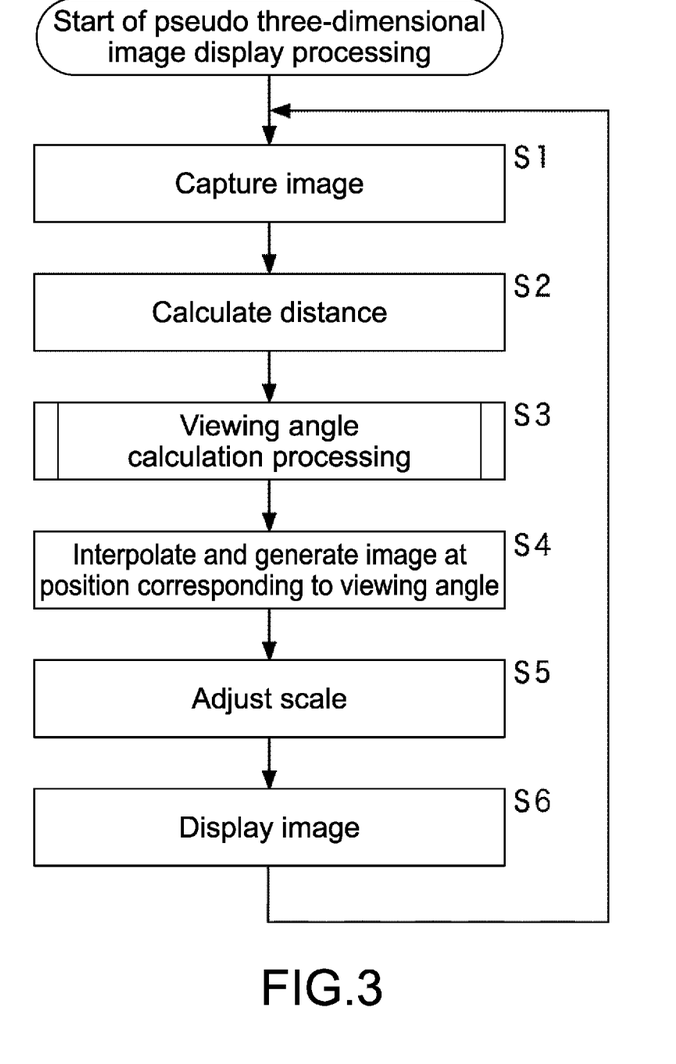
FIG. 3 is a flowchart for explaining pseudo three-dimensional image display processing by the pseudo three-dimensional image display apparatus of FIG. 2.

Here, the description returns to the flowchart of FIG. 3.

In Step S4, the image interpolation/generation section 43 interpolates and generates an image corresponding to the viewing angle from a pair of parallax images stored in the image storage section 32.

More specifically, the image interpolation/generation section 43 generates an intermediate parallax image corresponding to the viewing angle by using a pair of parallax images by a morphing method or the like, or generates an image that corresponds to the viewing angle and whose viewpoint is on a straight line connecting viewpoints of the parallax images but is other than the viewpoints (external viewpoint image).

Figure 6:
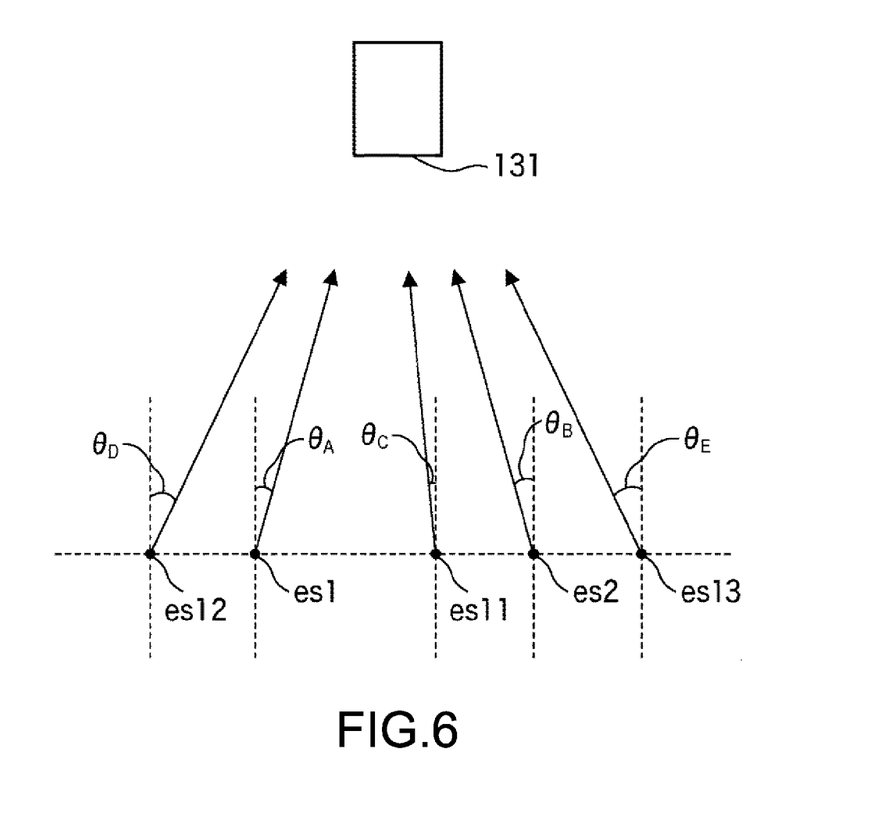
FIG. 6 is a diagram for explaining generation of interpolation images.

Specifically, as shown in FIG. 6, in a case where images obtained when an object 131 is viewed from viewpoints es1 and es2 at which viewing angles are theta A and theta B, respectively, are used as a pair of parallax images, an image viewed from a viewpoint es11 is generated as an intermediate parallax image having a viewing angle theta C, for example. Further, as shown in FIG. 6, the image interpolation/generation section 43 uses a similar pair of parallax images to interpolate and generate an image viewed from a viewpoint es12 (external viewpoint image) at a time when a viewing angle is theta D. In this way, as shown in FIG. 6, the image interpolation/generation section 43 uses a similar pair of parallax images to interpolate and generate an image viewed from a viewpoint es13 (external viewpoint image) at a time when a viewing angle is theta E. It should be noted that in FIG. 6, the viewpoint es11 is an intermediate viewpoint between the viewpoints es1 and es2 of the pair of parallax images, and the viewpoints es12 and es13 are each a viewpoint other than the viewpoints of the parallax images, that is, an external viewpoint.

In Step S5, the image interpolation/generation section 43 adjusts a scale by enlarging or contracting the interpolated and generated image in accordance with the distance d and supplies the image to the display section 12.

In Step S6, the display section 12 displays the image generated by interpolation in accordance with the viewing angle.

Figure 7:
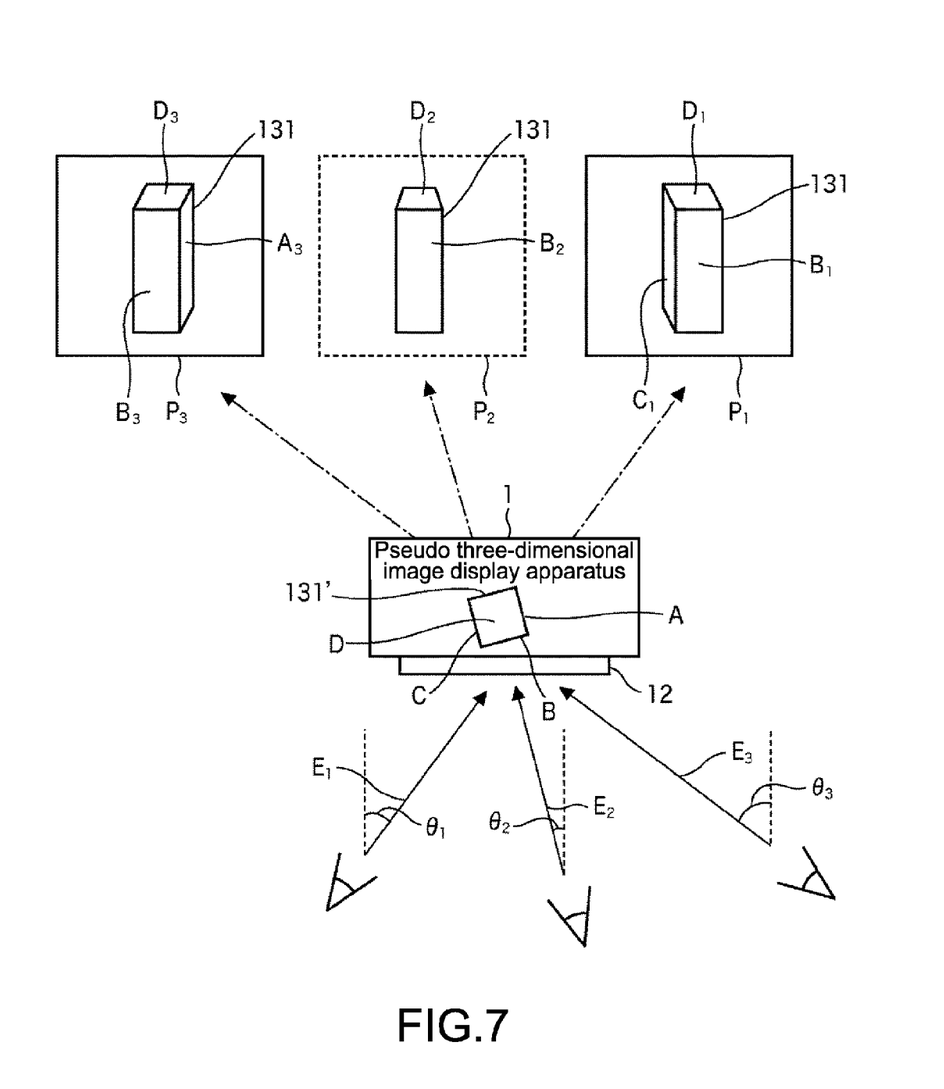
FIG. 7 is a diagram for explaining the generation of interpolation images.

By such processing, when the viewing angle is changed from theta 1 to theta 3 as shown in FIG. 7, for example, images in which surfaces constituting an object 131 are changed in accordance with the change in viewing angle are displayed as shown in images P1 to P3. In other words, in FIG. 7, in a case where a user views the display section 12 in a line of sight E1 indicated by the viewing angle theta 1, the image P1 in a state where surfaces B1, C1, and D1 are visible is displayed. Further, in a case where the user views the display section 12 in a line of sight E2 indicated by the viewing angle theta 2, the image P2 in a state where surfaces B2 and D2 are visible is displayed. Furthermore, in a case where the user views the display section 12 in a line of sight E3 indicated by the viewing angle theta 3, the image P3 in a state where surfaces A3, B3, and D3 are visible is displayed.

In other words, assuming that the object 131 is a square prism having a front surface as the surface B1, B2, or B3, the object 131 is displayed in a changed state in accordance with the viewing angle. As a result, it is possible to view a stereoscopic three-dimensional image on the display section 12 as if an object 131' (i.e., square prism) whose surface B faces the line of sight E2 with the viewing angle theta 2 were present in the pseudo three-dimensional image display apparatus 1.

Here, the display section 12 displays only two-dimensional images, but successively displays images in which viewpoints of the object 131 are changed in accordance with the viewing angle. Accordingly, the user 2 suffers a sensory illusion due to a motion parallax, with the result that when moving the pseudo three-dimensional image display apparatus 1 about the pitch or roll, the user 2 can view an image as if a three-dimensional image were displayed in a pseudo manner.

Further, even when the user 2 does not hold the pseudo three-dimensional image display apparatus 1 but places it on a desk with the display section 12 facing up, for example, it is possible for the user 2 to view a three-dimensional image in a pseudo manner while moving in a direction looking into the display section 12. As a result, it is possible to cause the user 2 to feel as if the user 2 looked into another three-dimensional space displayed by the display section 12 of the pseudo three-dimensional image display apparatus 1.

It should be noted that though the example in which a pair of images constituting parallax images corresponding to right and left eyes is used for generating an interpolation image has been described, an interpolation image may be generated from three images including parallax images that are also different in the vertical direction, for example, instead of the pair of images. Further, though the example in which the parallax images are registered in advance has been described, it may be possible to generate a parallax image from one image in a pseudo manner and then generate an interpolation image by using the technique described above, for example. Furthermore, it may be possible to store images captured in advance by an imaging device with a pan, tilt, and zoom function, and select an image corresponding to a viewing angle to use the image like an interpolation image. In addition, it may be possible to store, in the image storage section 32 in advance, parallax images constituted of moving images such as movie content of three-dimensional images. In such a case, it is possible to display the moving images as three-dimensional moving images in a pseudo manner by interpolating and generating the moving images corresponding to a viewing direction.

Second Embodiment (Structural Example of Another Embodiment of Function that is Realized by Pseudo Three-Dimensional Image Display Apparatus)

Heretofore, the example in which a distance from the user 2 or a viewing angle is calculated based on an image captured by the imaging section 11 has been described. In a case where the pseudo three-dimensional image display apparatus 1 is a portable terminal, however, it is conceived that a distance between the display surface of the display section 12 and the user 2 is not changed so much. In this regard, on the assumption that the display section 12 and the user are away from each other by a predetermined distance and the distance is not changed, it may be possible to determine a viewing angle by only detecting a roll and a pitch of the pseudo three-dimensional image display apparatus 1.

Figure 8:
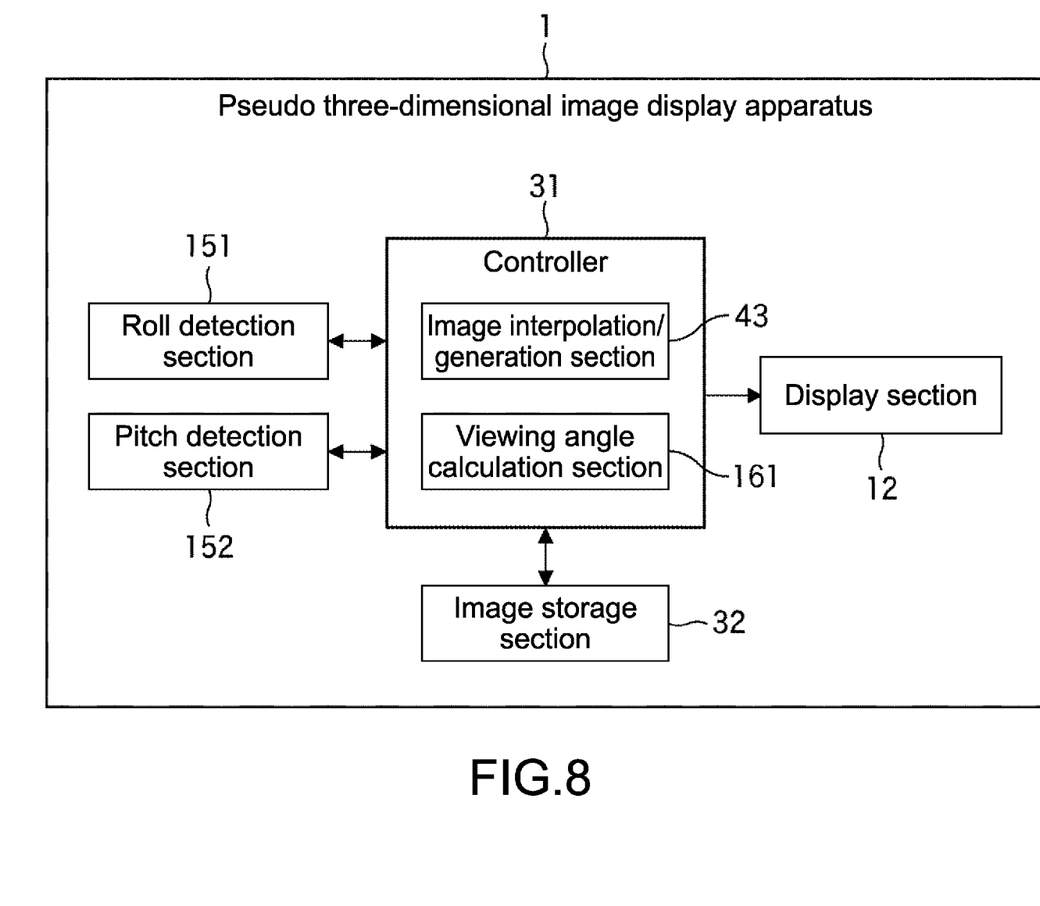
FIG. 8 is a diagram showing a structural example of another function that is realized by the pseudo three-dimensional image display apparatus of FIG. 1.

FIG. 8 is a diagram showing a structural example of a function realized by the pseudo three-dimensional image display apparatus 1 by detecting only a roll and a pitch to determine a viewing angle.

In other words, the pseudo three-dimensional image display apparatus 1 of FIG. 8 is different from that of FIG. 2 in that the imaging section 11 is eliminated, a roll detection section 151 and a pitch detection section 152 are newly provided, and a viewing angle calculation section 161 is provided instead of the viewing angle calculation section 42.

The roll detection section 151 and the pitch detection section 152 are each constituted of an acceleration sensor or the like, and detect a roll angle and a pitch angle of the pseudo three-dimensional image display apparatus 1, respectively, and supply the roll angle and the pitch angle to the controller 31.

The viewing angle calculation section 161 of the controller 31 calculates a viewing angle with a distance to the display surface of the display section 12 of the pseudo three-dimensional image display apparatus 1 being set as an average distance at a time when an average human being normally holds the pseudo three-dimensional image display apparatus 1, as in the technique described above.

(Viewing Angle Calculation Processing by Pseudo Three-Dimensional Image Display Apparatus 1 of FIG. 8)

Next, pseudo three-dimensional image display processing by the pseudo three-dimensional image display apparatus 1 of FIG. 8 will be described. It should be noted that as the pseudo three-dimensional image display processing, the processing of Steps S1, S2, and S5 in the flowchart of FIG. 3 are unnecessary and only the viewing angle calculation processing in Step S3 is different. Accordingly, only the viewing angle calculation processing will be described with reference to the flowchart of FIG. 9.

Figure 9:
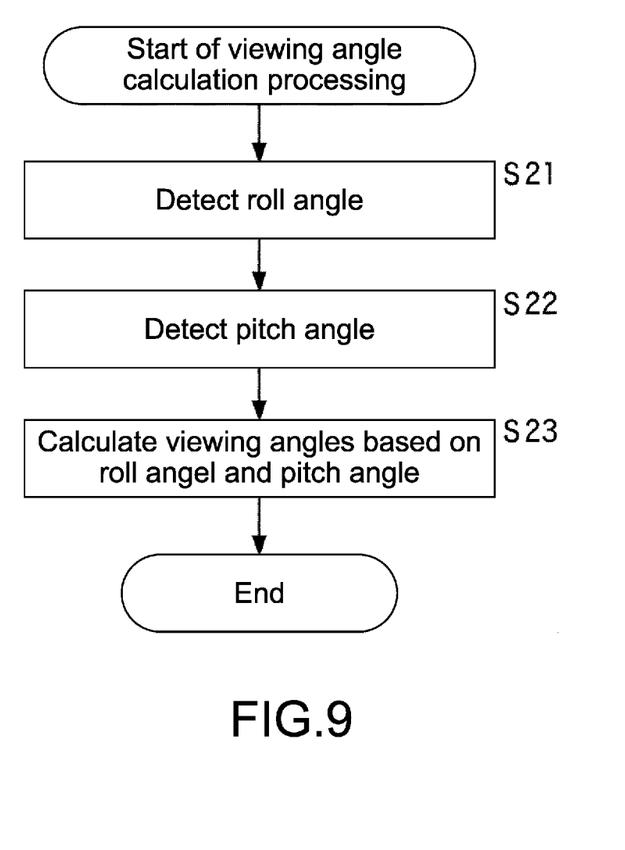
FIG. 9 is a flowchart for explaining viewing angle calculation processing by the pseudo three-dimensional image display apparatus of FIG. 8.

In Step S21, the roll detection section 151 detects a roll angle of the pseudo three-dimensional image display apparatus 1 and supplies the roll angle to the controller 31.

In Step S22, the pitch detection section 152 detects a pitch angle of the pseudo three-dimensional image display apparatus 1 and supplies the pitch angle to the controller 31.

In Step S23, the viewing angle calculation section 161 calculates viewing angles (theta, phi) of the horizontal direction and the vertical direction based on the roll angle and the pitch angle of the pseudo three-dimensional image display apparatus 1, those angles being supplied from the roll detection section 151 and the pitch detection section 152.

In this case, assuming that a face of a user faces the display section 12 at reference positions of the pitch angle and roll angle of the pseudo three-dimensional image display apparatus 1, the roll angle and the pitch angle are set as viewing angles as they are.

Since the viewing angles (theta, phi) are calculated as described above, it is possible to obtain a distance to a user based on an image and omit processing of enlargement or contraction in accordance with a distance, with the result that a processing load can be reduced. As a result, it is possible to impart such a pseudo three-dimensional image display function to an apparatus using an operation processing device whose image processing ability is not so high, such as a cellular phone.

As described above, a two-dimensional image can be displayed by switching viewpoints based on viewing angles with respect to the display surface of the display section 12. As a result, it is possible to display a three-dimensional image in a pseudo manner as if a three-dimensional image were displayed, though a two-dimensional image is displayed.

Incidentally, a series of processing described above can be executed by hardware, but can also be executed by software. In a case where the series of processing is executed by software, a program constituting the software is installed from a recording medium to a computer incorporated in dedicated hardware, a general-purpose personal computer capable of executing various functions by installing various programs, or the like.

Figure 10:
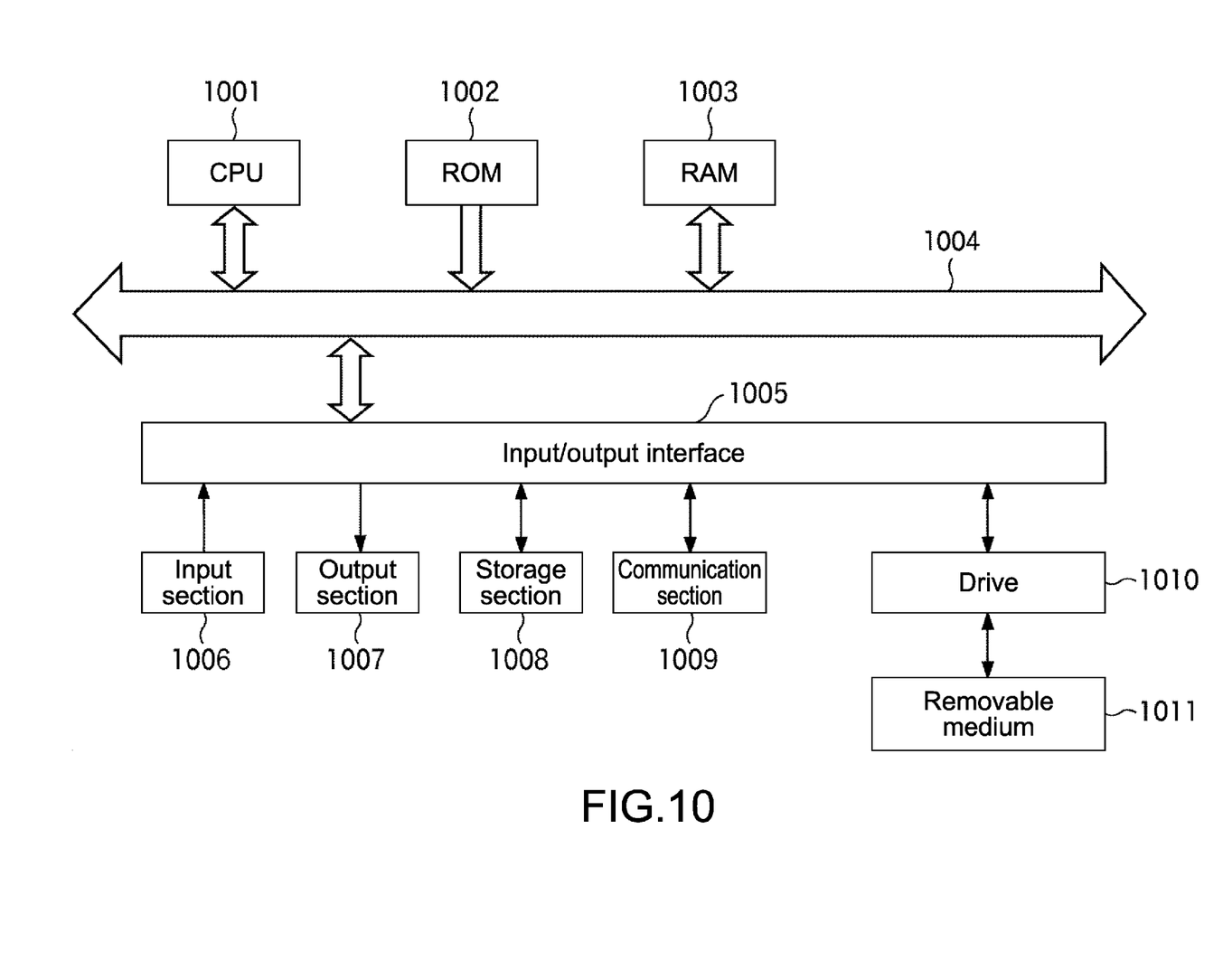
FIG. 10 is a diagram for explaining a structural example of a general-purpose personal computer.

FIG. 10 shows a structural example of a general-purpose personal computer. The personal computer incorporates a CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

Connected to the input/output interface 1005 are an input section 1006, an output section 1007, a storage section 1008, and a communication section 1009. The input section 1006 is constituted of an input device such as a keyboard and a mouse with which a user inputs an operation command. The output section 1007 outputs a processing operation screen or an image of processing results to a display device. The storage section 1008 is constituted of a hard disk drive for storing programs and various types of data, or the like. The communication section 1009 is constituted of a LAN (Local Area Network) adapter or the like and executes communication processing via a network represented by the Internet. Further, a drive 1010 that reads and writes data with respect to a removable medium 1011 such as a magnet disc (including a flexible disc), an optical disc (including a CD-ROM (Compact Disc-Read Only Memory) and a DVD (Digital Versatile Disc)), a magnet-optical disc (including an MD (Mini Disc)), and a semiconductor memory is connected to the input/output interface 1005.

The CPU 1001 executes various types of processing according to a program stored in the ROM 1002 or a program that is read out from the removable medium 1011 such as a magnet disc, an optical disc, a magnet-optical disc, and a semiconductor memory to be installed in the storage section 1008 and loaded from the storage section 1008 to the RAM 1003. Further, the RAM 1003 also stores data necessary for the CPU 1001 to execute various types of processing as appropriate.

It should be noted that in this specification, the step of describing a program recorded on a recording medium includes a series of processing executed in a chronological order of the description and also a series of processing that is not necessarily executed in a chronological order but executed in parallel or individually.

The present application contains subject matter related to that disclosed in Japanese Priority Patent Application JP 2009-241700 filed in the Japan Patent Office on Oct. 20, 2009, the entire content of which is hereby incorporated by reference.

REFERENCE SIGNS LIST 1 pseudo three-dimensional image display apparatus
11 imaging section
31 controller
32 image storage section
41 distance calculation section
42 viewing angle calculation section
43 image interpolation/generation section
151 roll detection section
152 pitch detection section

The invention claimed is:
1. An image display apparatus, comprising:
a display section for presenting an image;
a viewing angle calculation section for determining a viewing angle of a user relative to the display section; and
an image generation section:
for generating first image data representing a first image based on:
the user's viewing angle,
second image data representing a second image, and
third image data representing a third image; and
for supplying the first image data to the display section for presentation of the first image;
wherein the second image includes an object viewed from a first viewing angle and the third image includes the object viewed from a second viewing angle, the first viewing angle and the second viewing angle being different from each other and from the user's viewing angle.
2. The image display apparatus of claim 1, wherein the first, second, and third images are two-dimensional images.
3. The image display apparatus of claim 2, wherein the second and third images are, respectively, left-eye and right-eye images.
4. The image display apparatus of claim 1, further comprising an image storage section for storing the second and third images.
5. The image display apparatus of claim 1, further comprising an imaging section for capturing a fourth image of the user, wherein the imaging section views the user along a line perpendicular to the display section.
6. The image display apparatus of claim 5, wherein the imaging section is positioned on substantially the same plane as the display section.
7. The image display apparatus of claim 5, further comprising a distance calculation section configured to:
extract a face image from the fourth image; and
determine a distance between the display section and the user based on a size of the face image.
8. The image display apparatus of claim 5, wherein the viewing angle calculation section is configured to:
extract a face image from the fourth image;
determine a center position between eyes in the face image; and
determine the viewing angle of the user based on the center position.
9. The image display apparatus of claim 8, wherein the viewing angle calculation section is configured to determine the viewing angle of the user based on the center position and a distance between the display section and the user.
10. The image display apparatus of claim 1, further comprising an object detection sensor for determining a distance between the display section and the user.
11. The image display apparatus of claim 1, further comprising a distance calculation section for determining a distance between the display section and the user, wherein the image generation section is configured to generate the first image data based on the distance.
12. The image display apparatus of claim 1, further comprising:
a pitch detection section for detecting a pitch angle of the image display apparatus; and
a roll detection section for detecting a roll angle of the image display apparatus;
wherein the viewing angle calculation section is configured to determine the viewing angle of the user based on the pitch and roll angles of the image display apparatus.
13. A method of presenting an image on a display section of a display apparatus, comprising:
sensing, via an object detection sensor, a distance from the display section to a user;
determining, based on the sensed distance, a viewing angle of the user relative to the display section;
generating first image data representing a first image based on:
the user's viewing angle,
second image data representing a second image, and
third image data representing a third image;
wherein the second image includes an object viewed from a first viewing angle and the third image includes the object viewed from a second viewing angle, the first viewing angle and the second viewing angle being different from each other and from the user's viewing angle; and
presenting the first image on the display section.
14. A non-transitory, computer-readable storage medium storing a program that, when executed by a processor, causes a display apparatus to perform a method, the method comprising:
determining a viewing angle of a user relative to a display section of the display apparatus;

generating first image data representing a first image based on:
  the user's viewing angle,
  second image data representing a second image, and
  third image data representing a third image;
wherein the second image includes an object viewed from a first viewing angle and the third image includes the object viewed from a second viewing angle, the first viewing angle and the second viewing angle being different from each other and from the user's viewing angle; and
presenting the first image on the display section.

* * * * *